United States Patent [19]

Hsu

[11] Patent Number: 4,805,593
[45] Date of Patent: Feb. 21, 1989

[54] GAS SOLDERING IRON

[76] Inventor: Jui-Fu Hsu, 3F., No. 14, Lane 20, Hou Kang St., Taipei, Taiwan

[21] Appl. No.: 127,926

[22] Filed: Dec. 1, 1987

[51] Int. Cl.$^4$ ................................................ B23K 3/02
[52] U.S. Cl. .................................................... 126/414
[58] Field of Search ................... 126/414, 413, 409; 431/344; 222/3; 228/51

[56]  References Cited
U.S. PATENT DOCUMENTS

| 2,807,317 | 9/1957 | Penno | 126/413 |
| 4,119,088 | 10/1978 | Sim | 126/413 |
| 4,552,124 | 11/1985 | Nakajima | 126/413 |
| 4,648,380 | 3/1987 | Nakajima | 126/414 |
| 4,688,552 | 8/1987 | Tsai | 126/414 |
| 4,691,691 | 9/1987 | Patenaude | 126/414 |

Primary Examiner—Randall L. Green
Attorney, Agent, or Firm—Lowe, Price, LeBlanc, Becker & Shur

[57] ABSTRACT

A gas soldering iron includes a soldered joint, an on/off knob, a nozzle, a fibermetallic liner, a nozzle tube, a cooling fin, a nozzle protector, a gas outlet port, a gas refill port, a reservoir, a plastic cover, and a cap. When the on/off knob is pushed forward, the gas outlet port will be guided forward and gas injected into the liner. Upon filling the combustion liner, the gas is ignited with an igniter on the cap to heat the soldered joint. When the on/off knob is pulled backward, the nozzle will be guided backward and gas supply cut off, extinguishing the flame.

2 Claims, 4 Drawing Sheets

GAS SOLDERING IRON

TECHNICAL FIELD

The present invention relates to gas soldering irons.

BACKGROUND OF THE INVENTION

Many scientific products are made of combinations of metal or other materials that must be soldered together for assembly or repair.

Prior art of soldering irons, for the above generally are electrically operated to heat a soldered joint, and this disadvantageously may produce magnetization causing damage to precise parts in the product and being assembled or repaired and a downgrade in their service life. Therefore, electric welding machines and the soldering irons must be periodically demagnetized. Another disadvantage of the prior art described above is that soldering operations must be suspended in the event of power failure.

To overcome such defects, the soldering iron of the present invention is operated.

SUMMARY OF THE INVENTION

It is the primary object of the present invention to provide a gas soldering iron.

It is another object of the present invention to provide a gas soldering iron unaffected by electrical power failure.

It is still another object of the present invention to provide a gas soldering iron which will not produce magnetization tending to adversely affect electric parts or downgrade the service life of the electric parts being soldered.

It still another object of the present invention to provide a gas soldering iron which may be refilled with gas when required.

It is still another object of the present invention to provide a gas soldering iron which is simple in construction.

It is a further object of the present invention to provide a gas soldering iron which is economical to produce.

DETAILED DESCRIPTION OF THE PREFERRED EMBODIMENT

Figure 1:
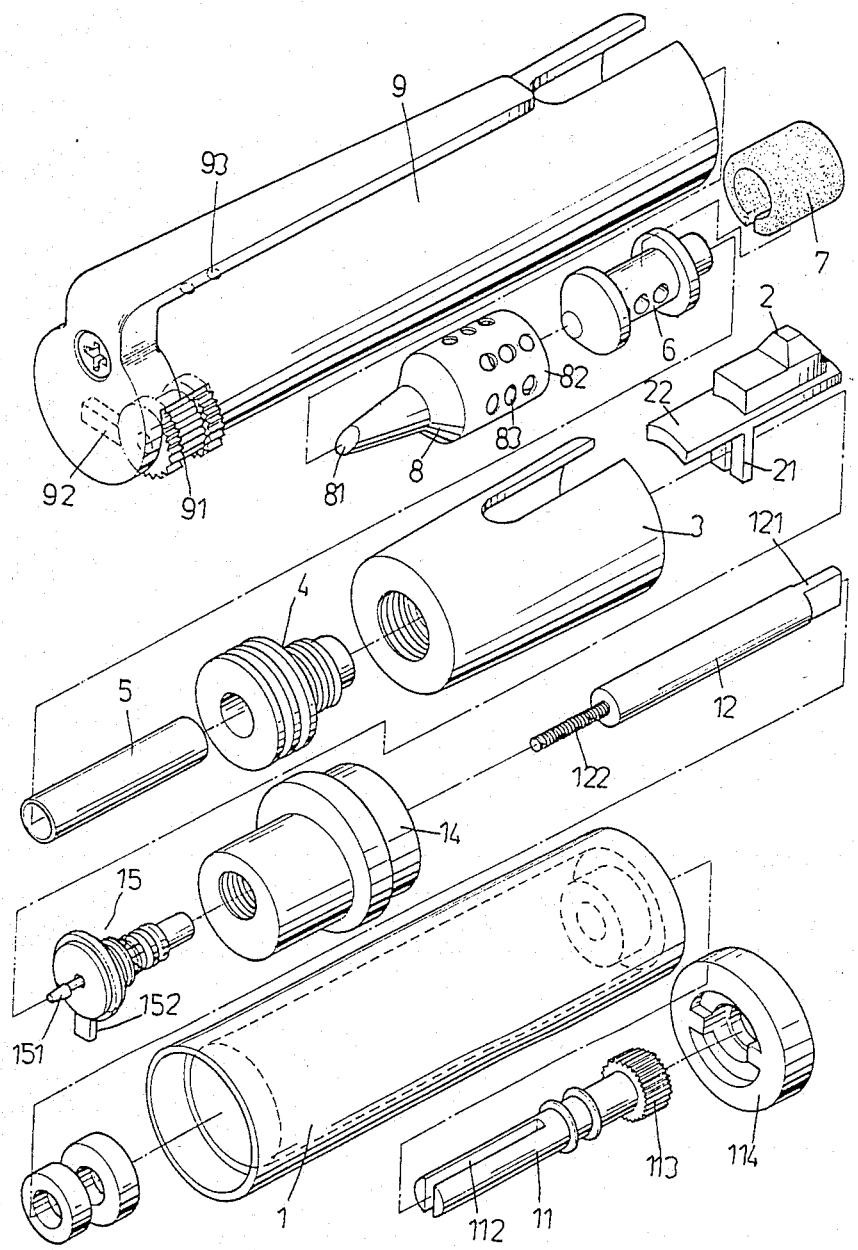
FIG. 1 is an exploded perspective view of the gas soldering iron.

The soldering iron in FIG. 1 comprises a cylindrical reservoir 1 including a gas refill port 11 connected to a gas regulating rod 12, a link post 14, a gas outlet port 15, an on/off knob 2, a nozzle protector 3, a cooling fin 4, a nozzle tube 5, a nozzle 6, a fibermetallic liner 7, a soldering joint 8 and a cap 9. The cylindrical reservoir 1 has its rear end connected with the gas refill port 11 which has a tenon 112 at the front end and a wheel 113 at the rear end covered by a plastic cover 114 for adjusting flame. The front end of the reservoir 1 is connected with the rear end of the link post 14. The front end of the gas regulating rod 12 is threadedly connected to the inside rear end of the link post 14. The rear end of the gas regulating rod 12 has a mortise 121 and is inserted into the tenon 112 of the gas refill port 11. The front end of the link post 14 also has internal threads and is connected with the rear end of the gas outlet port 15 which has a head 151 at its front end and a protuberance 152 at its center. The head 151 is clipped and guided by the on/off knob 2 for injecting gas. The protuberance 152 varies the space of the link post 14 to control the supply of gas to the nozzle. Gas injected from the head 151 of the gas outlet port 15 will pass through the passage of the nozzle tube 5 into the nozzle 6 and then penetrates through the fibermetallic liner 7 for ignition by an igniter to heat the soldered joint 8. The on/off knob 2 mounted on reservoir 1 has a projection 21 clipped to the head 151 of the gas outlet port 15 and a protuberance 22 which faces toward a trough of the nozzle protector 3 connected with the link post 14. The forward end of the nozzle protector 3 has internal threads threaded to cooling fin 4 which has three fins at its forward end for dissipating heat. The nozzle tube 5 having a longitudinal passage at its center for the passage of gas is placed in the cooling fin 4 with one end inserted into the nozzle 6. The front of the nozzle 6 has an inclined umbrella-shaped portion, a trough or reduced diameter portion of at its center with two holes drilled in the trough to releasing gas. The trough further is wrapped in the fibermetallic 7. The nozzle 6 is to be inserted into the soldered joint 8 which has a solder tip 81, a combustion chamber 82 and several holes 93. The present invention may be inserted into a pocket for easy storage when not in use, and the wheel 91 and the flint 92 ignite the gas to heat the soldered joint 8. The holes 93 dissipate heat when the welding work is completed. Both the protuberance 152 of the gas outlet port 15 and the plastic cover 114 are for flame adjustment by varying the space in the link post 14 which is to store gas for injection from the head 151. By rotating the plastic cover 114, the tenon 112 and the mortise 121 will rotate simultaneously and the threaded end of the gas regulating rod 12 connected with the link post 14 will move forward or backward to vary the space in the link post. Likewise, by moving the protuberance 152 of the gas outlet port 15 leftward or rightward, the threaded end of the gas outlet port 15 connected with the link post will move to vary the space.

Figure 2:
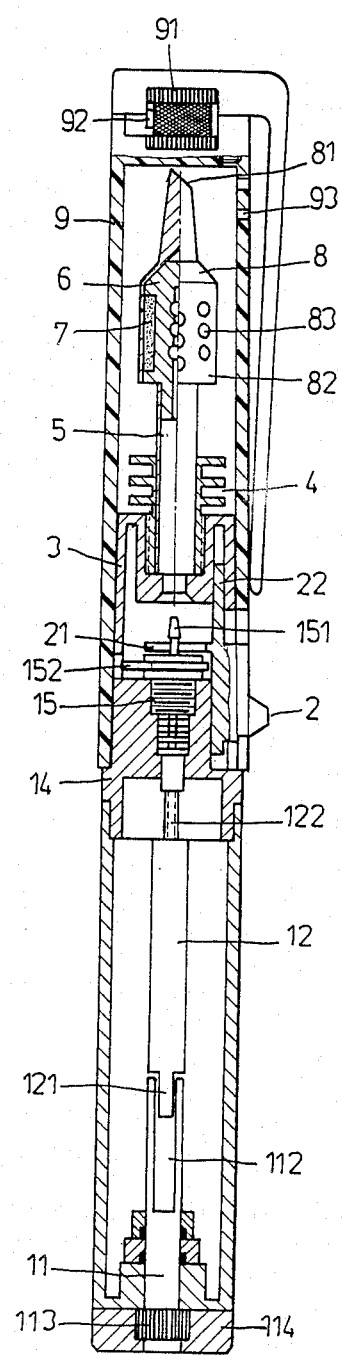
FIG. 2-4 are sectional views of the present invention in different operational modes.

As shown in FIG. 2, the gas soldering iron of the present invention is shown assembled.

Figure 3:
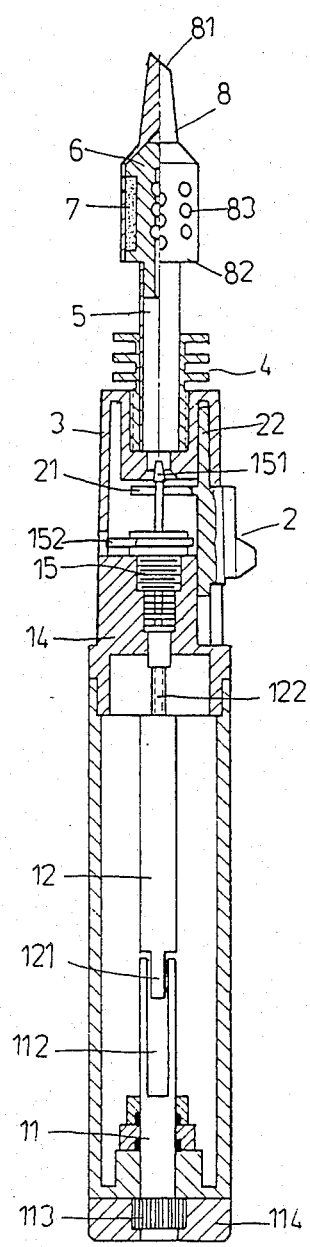

With reference to the FIG. 3, the on/off knob 2 has been pushed forward and the protuberance 22 of the on/off knob 2 is fixed at the trough 31 of the nozzle protector 3. This movement will lead the head 151 of the gas outlet port 15 forward and inject gas into the nozzle tube 5 and then to the nozzle 6. The nozzle, upon filling with gas, will allow gas to penetrate through the fibermetallic liner 7. At that moment, gas will permeate the combustion chamber 82 of the soldered joint 8 and thus can be lighted by the wheel 91 and the flint 92 of the cap 9 to heat the soldered tip 81.

Figure 4:
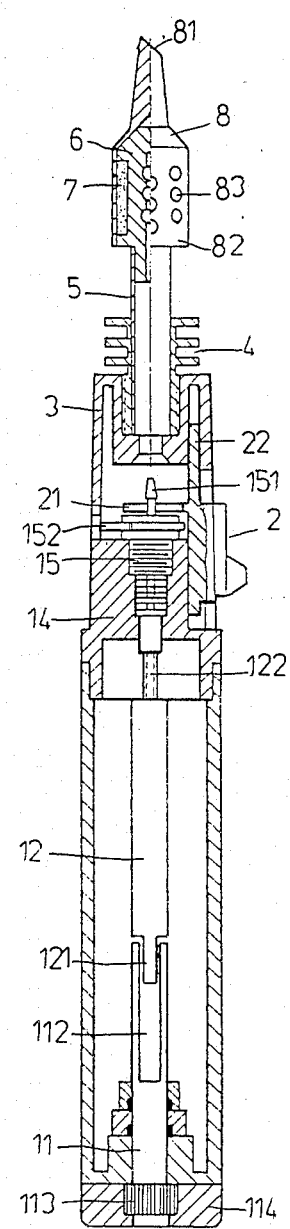

FIG. 4 shows the knob 2 pulled backward which lead the protuberance 22, the fixture 21 and the head 151 of the gas outlet port 15 backward simultaneously. Gas, therefore, is cut, and the flame is extinguished.

Figure 5:
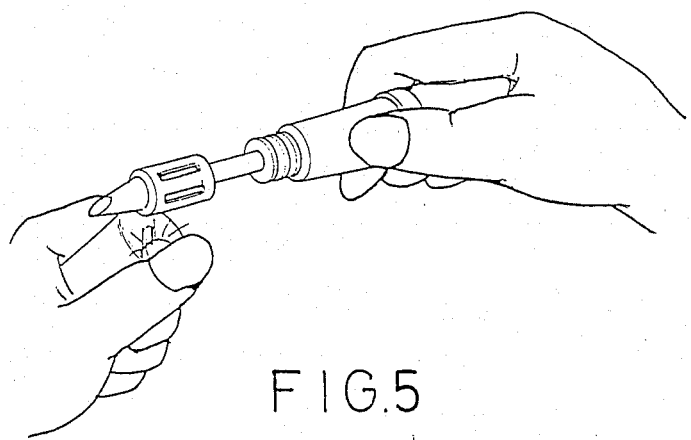
FIG. 5, 6, 7 are perspective views of the present invention.
Figure 6:
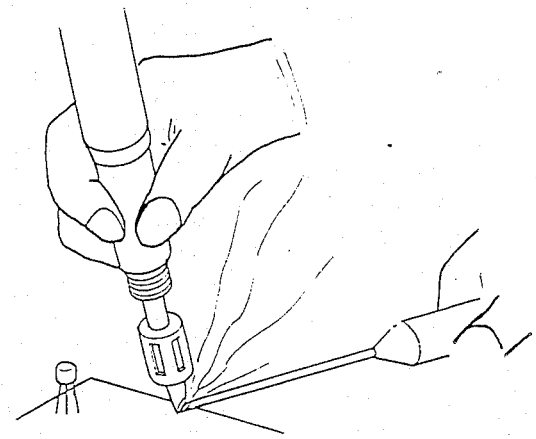
Figure 7:
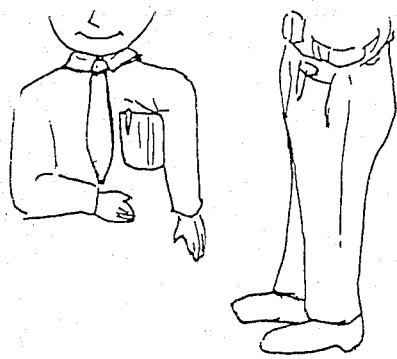

With reference now to the FIG. 5, 6 and 7, FIG. 5 shows how to light the combustion chamber 83 of the soldered joint 8. FIG. 6 shows the soldered tip 81 of the soldered joint 8 has been heated and is able to solder electric parts together, and FIG. 7 shows the gas soldering iron of the present invention is capable to be inserted into a pocket or a suitcase.

I claim:

1. A gas soldering iron comprising a reservoir including a gas refill port, a link post connected to the reservoir, a gas regulating rod mounted in the reservoir, a gas outlet port connected to the link post, an on/off knob mounted to the gas outlet port for moving the gas outlet port interconnected to the gas refill port through the gas regulating rod to control the flow of gas from the reservoir, a nozzle protector, a cooling fin projecting forward from the protector, a nozzle tube extending within the protector, a nozzle mounted to a forward end of the nozzle tube to receive said gas through the tube from the outlet port, and a soldering joint mounted to the nozzle, wherein said on/off knob is placed on the nozzle protector and includes a protuberance received in said nozzle protector when the on/off knob is pushed forward towards the nozzle, and said knob also including a projecting captivating to move a head of the said gas outlet port to control gas flow to the nozzle from the reservoir; said nozzle protector having a trough at a rear top portion thereof and threaded at a front inner end thereof, said trough receiving the protruberance of said cooling fin, said nozzle tube extending through said cooling fin having fins at one end for dissipating heat and the other end of the cooling fin having threads for threaded connection with the threaded end of said nozzle protector; wherein when the on/off knob is pushed forward, the protuberance will be guided forward and clamped by the trough of the nozzle protector with the projection of the knob moving the head of the gas outlet port forward so that gas is released from the reservoir and injected into the nozzle tube; and wherein when the on/off knob is pulled backward, the protuberance will be guided backward and the head of the gas outlet port will retreat to its original position to disrupt the flow of gas through the nozzle tube.

2. The gas soldering iron defined in claim 1, wherein the gas regulating rod is threaded into said gas outlet port at one end thereof and the other end of the rod is a mortise end inserted into a tenon of the said gas refill port for flame adjustment.

* * * * *